US006925552B2

United States Patent
Reilly et al.

(10) Patent No.: US 6,925,552 B2
(45) Date of Patent: Aug. 2, 2005

(54) METHOD AND SYSTEM WITH MULTIPLE EXCEPTION HANDLERS IN A PROCESSOR

(75) Inventors: Matthew H. Reilly, Stow, MA (US); Matthew C. Mattina, Hudson, MA (US); Shane L. Bell, Shrewsbury, MA (US); Chuan-Hua Chang, Natick, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 681 days.

(21) Appl. No.: 09/884,675

(22) Filed: Jun. 19, 2001

(65) Prior Publication Data

US 2002/0194467 A1 Dec. 19, 2002

(51) Int. Cl.[7] .................................................. G06F 9/00
(52) U.S. Cl. .................................................... 712/244
(58) Field of Search ......................................... 712/244

(56) References Cited

U.S. PATENT DOCUMENTS

| 5,634,023 A | * 5/1997 | Adler et al. ................ 712/244 |
| 5,765,007 A | * 6/1998 | Rahman et al. ............ 712/248 |
| 6,681,322 B1 | * 1/2004 | Safford et al. ............. 712/244 |
| 6,721,874 B1 | * 4/2004 | Le et al. ..................... 712/218 |

OTHER PUBLICATIONS

Dehnert, James C. et al., "The Transmeta Code Morphing Software: using speculation, recovery, and Adaptive retranslation to address real–life challenges", Mar. 2003, Proceedings of the international symposium on Code generation and optimization, pp. 15–24.*

Ando, Hideki, "Unconstrained Speculative Execution with Predicated State Buffering", May 1995, ACM SIGARCH Computer News, Proceedings of the 22nd annual international symposium on Computer Architecture, vol. 23 Issue 2, pp. 126–137.*

* cited by examiner

*Primary Examiner*—Eddie Chan
*Assistant Examiner*—Charles Harkness

(57) ABSTRACT

An exception handler for a processor is split into two functional units to permit exceptions to be classified into two categories. The first category of exceptions includes performance critical excepted instructions, while the second category includes non-performance critical excepted instructions. The performance critical exceptions are routed to a speculative exception handler, which resolves the exceptions speculatively, even though the excepted instruction may lie in a speculative path of the program flow. The non-performance critical exceptions are routed to a non-speculative exception handler that only resolves exceptions when the excepted instruction is certain to execute in an actual path of the program flow.

25 Claims, 1 Drawing Sheet

METHOD AND SYSTEM WITH MULTIPLE EXCEPTION HANDLERS IN A PROCESSOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to the interpretation and execution of software instructions by a processor in a computer system. More particularly, the present invention relates to the handling of program instructions for which an exception has occurred. Still more particularly, the present invention relates to an exception handler for a processor that operates more efficiently by dividing excepted instructions into different categories.

2. Background of the Invention

A computer system includes a number of components with specialized functions that cooperatively interact to produce the many effects available in modern computer systems. The ability of these various components to exchange data and other signals is vital to the successful operation of a computer system. Typically, components interact by reading or writing data or instructions to other components in the system.

Computer systems typically include a processor (or CPU), random access memory (RAM), and certain peripheral devices such as a floppy drive, a keyboard and a display. These components typically couple together using a network of address, data and control lines, commonly referred to as a "bus." As computer technology evolved, it became common to connect additional peripheral devices to the computer through ports (such as a parallel port or a serial port), or by including the peripheral device on the main system circuit board (or "motherboard") and connecting it to the system bus.

The computer operates by having data flow through the system, with modification of the data occurring frequently. Traditionally, the CPU controls most activities in the computer system. The CPU supervises data flow and is responsible for most of the high-level data modification in the computer. In addition, the CPU receives signals from the peripheral devices, reads and writes data to memory, processes data, and generates signals controlling the peripheral devices. The CPU is often referred to as the "brain" of the computer system.

The CPU is a device that operates according to instructions programmed by a designer or programmer. Thus, every operation that the CPU performs is based on one or more programmed instruction. In normal operation, the CPU performs many operations on an instruction, three of which are: (1) it fetches the instruction; (2) it decodes the instruction; and (3) it executes the instruction. In a single "pipeline" CPU architecture, each of these different operations is performed sequentially. To improve CPU performance, modern processor architectures often include a plurality of instruction pipelines to enable the CPU to perform operations on multiple instructions in parallel. To further improve CPU performance, pipelined processors often attempt to predict which instructions should be fetched, decoded and perhaps even executed, even before it is certain that the instruction forms part of the program flow. These predictions typically are performed pursuant to parameters programmed in a prediction algorithm that attempt to determine which branch the program will follow. Thus, in modern CPU designs, the CPU may operate on multiple instructions in different pipelines, and may begin operating on instructions that ultimately are not part of the program.

During normal CPU operation, any error in fetching, decoding, executing or otherwise processing an instruction is referred to as an "exception." Put simply, an excepted instruction is an instruction that cannot be properly executed by the processor. Thus, for example, if an instruction cannot be accurately decoded, or if an instruction code is not recognized, that is an exception event. Another type of exception occurs when the CPU performs an erroneous prediction of the instruction flow. Thus, if the program branches differently than that predicted by the prediction algorithm, then instructions may be fetched and decoded which are unnecessary to proper CPU operation. The initial divergence from the program flow is typically referred to as an exception.

As processors become faster, they are designed to execute more instructions in parallel. Every instruction has the possibility to except, and thus, as the CPU operates on more instructions, the greater the number of exceptions that will arise. In addition, exceptions can be detected at various stages of the pipeline. As the pipeline becomes longer and wider, more stages or ports are created from which exceptions may be issued. As a further consequence of handling a multiplicity of instructions in parallel, the processor must look further ahead the program flow to fetch and decode instructions that may be needed. The further the CPU must predict ahead, the greater the likelihood that a misprediction will occur, and the more instructions that must be flushed when a misprediction is discovered. It is generally desirable for a CPU to recognize an exception as early as possible, and where necessary, to take corrective steps to handle the exception.

Thus, modern CPUs must handle an increasingly large number of exceptions. In conventional CPU designs, all exceptions are handled by a single exception handler, regardless of the type of exception. Thus, all exceptions are routed to the exception handler, which typically is implemented on-board the processor chip. The exception handler operates by sorting through the exceptions and selecting an exception to resolve. If the exception was the result of a misprediction, the exception handler would recognize the exception as a misprediction, and would direct the instruction pointer to branch to the appropriate instruction to track the actual program flow. Typically, the exception handler is designed to select the oldest exception to analyze and correct. The oldest exception is the earliest instruction in the program flow. Thus, assume a program is executing with instruction A, B, C, D E and F in sequence. Because most conventional processors fetch instructions in-order, the CPU may fetch instruction B at time t, and may fetch instruction F at time t+4. Because of the out-of-order nature of certain processors, the CPU may actually execute instructions B and F at the same time, although they were brought into the CPU at the different times. If instructions B and F both were found to have an exception, the CPU would treat the exception created by instruction B as older than the exception created by instruction F. Because instruction B happened earlier in the program flow, the exception handler would first analyze instruction B for problems. By handling the oldest exception first, the exception handler hopefully will focus its attention on exceptions that are in the correct path of the program, and will not spend an excessive amount of time handling exceptions that are in a mispredicted path. Because instruction B was a misprediction, instruction F would be flushed and would not require resolution.

As noted above, as modem processor designs operate on a greater number of instructions, more exceptions arise. To handle this contingency, exception handlers in modem processor designs have become increasingly large to enable the exceptions to be queued while they await resolution. Thus, the amount of time to resolve a given exception has increased because of the size of the exception queue, and the many types of exceptions that must be addressed. Thus, while CPU designs have become increasingly fast, exception handlers have become bigger and slower.

It would be advantageous if a new architecture and method was created to handle exceptions more quickly. In particular, it would be advantageous if certain critical exceptions could be resolved in more expeditious fashion to minimize the latency of the processor, and to achieve greater processor efficiency. Despite these apparent advantages, to date no one has developed an exception handler for a processor that resolves these issues.

BRIEF SUMMARY OF THE INVENTION

The present invention solves the deficiencies of the prior art by classifying excepted instructions into different categories, to thereby permit critical exceptions to be handled more expeditiously. In particular, the present invention includes two or more exception handlers in the processor circuitry. One exception handler preferably receives critical exceptions, while the other exception handler receives non-critical exceptions.

According to a preferred embodiment, an exception handler comprises two sections with streamlined operation. The implementation of two exception handling sections permits exceptions to be split into two classes. Exceptions that are performance critical are routed to one section of the exception handler, and exceptions that are not performance critical are routed to the other section. Splitting the exception handling functions in this manner facilitates quicker design times, faster cycle times, and reduced pipeline delays. According to the preferred embodiment, the performance critical exception handler includes sufficient ports to handle critical exceptions that are routed from different pipeline stages. The non-performance critical handler receives the remaining exceptions. Because these exceptions are not performance critical, this exception handler can be simplified by narrowing this exception handler to the issue width of the processor or narrower.

According to the preferred embodiment of the present invention, exceptions are classified into two categories, which comprise performance critical exceptions and non-performance critical exceptions. The performance critical exceptions may include, for example, branch mispredictions, while the non-performance critical exceptions may comprise instructions that cannot be decoded, or instructions which would produce a system error (such as a divide by zero operation). The different categories of exceptions are handled separately in two different exception handlers. Exceptions that are performance critical are handled speculatively to permit quicker resolution of these exceptions so as not to delay the program execution. Thus, performance critical exceptions are resolved even though it is not certain that these exceptions lie in the actual program path. Conversely, non-performance exceptions are handled non-speculatively, so that the exception is resolved only when it is known to lie in the actual program path.

These and other aspects of the present invention will become apparent upon analyzing the drawings, detailed description and claims, which follow.

DESCRIPTION OF THE DRAWINGS

For a detailed description of the preferred embodiments of the invention, reference will now be made to the accompanying drawings in which.

NOTATION AND NOMENCLATURE

Figure 1:
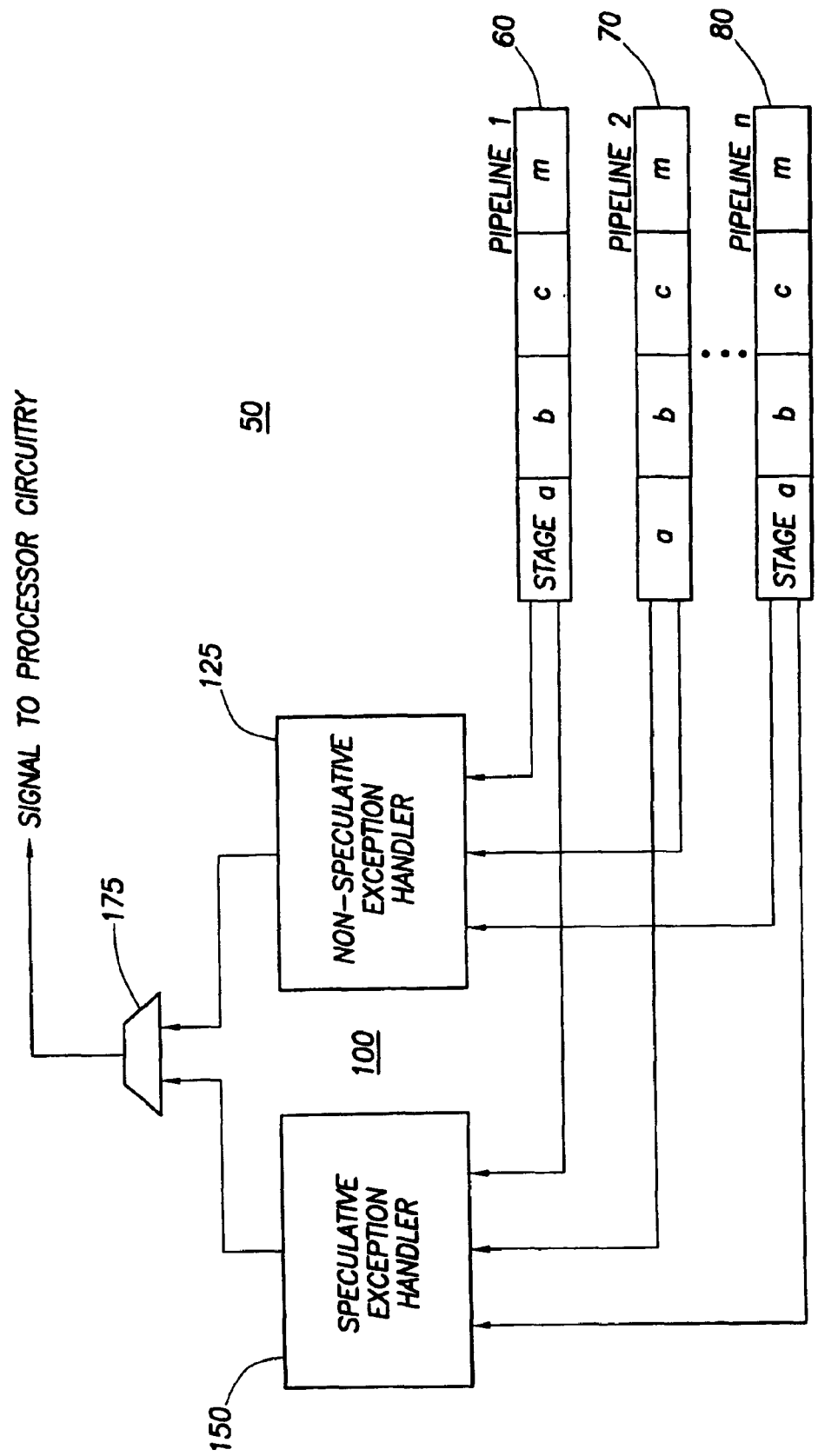
FIG. 1 is a partial illustration of a processor constructed in accordance with the preferred embodiment with two exception handlers.

Certain terms are used throughout the following description and claims to refer to particular system components. As one skilled in the art will appreciate, processor and computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. The term "CPU", "processor", and "microprocessor" are used synonymously to broadly refer to the device in a computer system that interprets and executes programmed instructions. The term "exception" or "excepted instruction" refers to an event or instruction that causes suspension of normal program execution. To the extent that any term is not specially defined in this specification, the intent is that the term is to be given its plain and ordinary meaning.

DETAILED DESCRIPTION OF THE PREFERRED EMBODIMENTS

Referring now to FIG. 1, the present invention constructed in accordance with the preferred embodiment comprises a processor 50 with a plurality of pipelines 60, 70, 80 for fetching, decoding and executing program instructions. The width of the pipeline may be any arbitrary size, as denoted by the indication that n pipelines may be implemented. Each pipeline also has a plurality of stages at which different operations may occur, including for example, fetching, decoding and executing program instructions. Other stages may also be provided as desired in the pipeline, without limitation. Each of the pipelines have been shown as including m stages for purposes of illustration, with the understanding that the number of pipeline stages is not material to the teachings of the present invention.

According to the preferred embodiment, the processor 50 includes an exception handling section 100 that receives excepted instructions from one or more stages of any of the pipelines. In accordance with the preferred embodiment, and as shown in FIG. 1, the exception handling section 100 comprises a speculative exception handler 150 and a non-speculative exception handler 125. The exception handlers 125, 150 may be configured as a single unit, or can be configured separately, as desired by the designer.

The speculative exception handler 150 preferably handles critical exceptions that need to be resolved in an expeditious manner so as to resume the actual program path as early as possible. An example of a critical exception in the preferred embodiment is branch mispredictions. Mispredictions occur on a relatively frequent basis, and it is generally desirable from a performance perspective to handle such exceptions on an expedited basis. A process operation cannot be completed until an exception arising from a branch misprediction is resolved. Thus, branch mispredictions potentially delay completion of a program. Other examples of performance critical exceptions (in addition to branch mispredictions) according to the preferred embodiment include load/store order traps and jump mispredictions. A load/store order trap occurs when a store instruction precedes a load address instruction in the process flow, but the load address instruction executes earlier than the store instruction. Thus, if these instructions execute out-of-order, the wrong value may be loaded. A load/store order trap preferably is recognized by one or more algorithms in the processor, and the speculative exception handler 150 then causes the load operation to be re-executed so that the proper load value is loaded in the desired register.

The exception handler 150 is referenced as a speculative handler in FIG. 1, denoting that exceptions may be taken out of order, if doing so would improve performance. Thus, speculative exception handler 150 may begin processing an exception as soon as it arrives, even though prior instructions have not yet executed. Preferably, the exceptions routed to the speculative exception handler 150 are sufficiently critical to the performance of the processor 50 that the speculative exception handler 150 does not wait to confirm that the exception lies in the path of the executing program. Thus, the speculative exception handler 150 will resolve excepted instructions even though it is not clear that the exception lies in the actual proper path of the program flow. According to the preferred embodiment, the risk that time and resources may be wasted in resolving such speculative instructions is out-weighed by the performance gain that results from expeditious resolution of these critical instructions.

In accordance with the preferred embodiment, the speculative exception handler 150 preferably receives critical exceptions from each stage of the various pipelines, although this is not a requirement of the present invention. The exceptions may be detected and flagged as critical by any suitable techniques or algorithms running on the processor. Typically, the processor includes hardware that detects each possible type of exception. Thus, if the decoding engine is unable to decipher an instruction code, an invalid instruction detection algorithm will cause the instruction to be flagged and routed to the non-critical handler 125. Similarly, if a branch misprediction algorithm detects an actual program branch path that differs from the predicted path, it flags the mispredicted branch instruction and causes it to be routed it to the speculative exception handler 150. As another example, a load/store trap detector algorithm may scan each load instruction to ensure that a load/store trap has not occurred. If a load/store trap is detected, the excepted load instruction is routed to the speculative exception handler 150 with an indication that a load/store trap has occurred with this instruction. As one or more exceptions arrive at the speculative exception handler 150, the speculative exception handler 150 selects one of the excepted instructions to be resolved (which in the preferred embodiment is the oldest excepted instruction), even though the instruction may still be speculative in the sense that the processor does not yet know for sure that this instruction will need to execute. If the excepted instruction is a branch misprediction, the processor preferably will resolve the exception by initiating the fetching and decoding of the correct branch destination instruction, so that the program can be completed without excessive delay.

The non-speculative exception handler 125 preferably handles non-critical exceptions that are detected in one or more of the pipeline stages. Typically, the non-critical exceptions are those exceptions that are detected as invalid or illegal instructions. This includes instructions that cannot be decoded, and instructions which, when executed, violates a rule of operation (such as divide by zero). Other non-critical excepted instructions include arithmetic overflows and cache parity errors. These sorts of non-critical exceptions arise on a relatively infrequent basis. Because these excepted instructions are not performance critical, the non-speculative exception handler 125 does not initiate resolution of these exceptions until it is clear that they reside in the actual program path. Thus, the non-speculative exception handler 125 preferably delays resolution of the non-critical exceptions until it is clear that the instruction needs to be executed to complete the program. If the non-critical exception is discovered to be down a bad path such as from the result of a mispredicted branch, the exception is flushed without being selected by the non-speculative exception handler 125. Stated differently, the non-speculative exception handler 125 only selects exceptions for resolution that are definitely in the actual program path.

The present invention seeks to classify every possible exception into critical exceptions that need to be handled quickly for performance purposes, or non-critical exceptions that can be resolved on a less expeditious basis without significantly impacting performance. Except as specifically stated in the appended claims, the present invention is not intended to be limited to any particular classification of exceptions. Thus, the decision of which exceptions are classified in each category is arbitrary, and is left to the discretion of the system designer or architect. The net result, preferably, is that non-speculative exception handler 125 can be figured as a relatively large, but slower handler, while speculative exception handler 150 is configured as a smaller, faster handler to effectuate exception handling that enhances processor performance without a large associated cost.

In the event that multiple excepted instructions are pending, the non-speculative and speculative exception handlers 125, 150 may select the instruction to execute based on a variety of different criteria, and the criteria used between the different exception handlers may differ. Preferably, however, if multiple excepted instructions are present in either handler, the handler selects the pending instruction queued in that handler which represents the earliest excepted instruction in the program flow. In addition, if an exception arises from an invalid branch, hardware flushes the excepted instruction and all younger instructions to prevent resources from being wasted and incorrect program operation in handling an exception from an invalid branch.

The exception handlers 125, 150 may be configured in a variety of ways to recognize the existence and type of excepted instruction. For example, each of the exception handlers 125, 150 may include a queue in which excepted instructions can be stored with an appropriate flag or code that indicates the type of exception. When an instruction is selected from the queue, the instruction and flag are transmitted to appropriate logic circuitry to resolve the exception. This circuitry may be integrated with the exception handler logic, or may be separated and located elsewhere in the processor logic. Preferably, on each cycle, the speculative exception handler 150 selects an excepted instruction to resolve. Similarly, the non-speculative exception handler 125 will select an excepted instruction to resolve, if any instruction is pending in that handler that is certain to lie in the actual program path.

According to the preferred embodiment, a multiplexer 175 or other similar circuit or logic combines the potential output from the two handlers 125, 150 onto a single set of wires to minimize the circuitry required to respond to the exception handlers 125, 150. Thus, according to the preferred embodiment, the multiplexer 175 selects one of the selected exceptions from handlers 125, 150 and signals other parts of the processor to indicate that en exception has arisen that is ripe for resolution, or which has been already resolved. A variety of different multiplexing schemes may be used to determine which exceptions to select from the handlers 125, 160. Moreover, it is possible that different multiplexing decisions may be implemented in the same system, based on various operating conditions or parameters. Generally, according to the preferred embodiment, the default condition of the multiplexer 175 is to select the non-critical exceptions selected by non-speculative exception handler 125, if such an exception appears at the output port of the non-speculative exception handler 125. The non-speculative exception is chosen since it is guaranteed to be an exception from the actual program flow. If no excepted instruction s provided at the output port of the non-speculative exception handler 125, the multiplexer 175 selects the excepted instruction appearing at the output port of the speculative exception handler 150. According to one embodiment, the multiplexer 175 may be configured to periodically select the speculative handler 160 even in the event that an exception is pending at the output port of the non-speculative exception handler 125 to ensure that the speculative exception handler 150 does not become starved. As yet another alternative, various other arbitration schemes may be used to determine how the exceptions are selected from the exception handlers 125, 150, with the understanding that one of the primary criteria is that handling of critical exceptions is generally expedited, while non-speculative exceptions are guaranteed to be from the actual program path. As yet another embodiment, the multiplexer 175 may be omitted, and separate lines may extend from each exception handler 125, 150 to the rest of the processor circuitry. In this event, redundant circuitry may be required in the processor circuitry to handle the dual output ports from the exception handling section 100.

As noted above, the exception handlers 125, 150 may function to store and select exceptions as they arrive, with the resolution of the exception occurring in other logic in the processor. Thus, the output of the handlers 125, 150 may transmit the excepted instruction and type of instruction to other logic in the processor 50 that resolves the exception.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
   a first exception handler that receives and handles critical excepted instructions, wherein the first exception handler handles the critical excepted instructions even if the critical excepted instructions are still speculative; and
   a second exception handler that receives and handles non-critical excepted instructions.

2. The processor of claim 1, wherein the critical excepted instructions comprise exceptions that are performance critical.

3. The processor of claim 2, wherein the critical excepted instructions include branch mispredictions.

4. The processor of claim 2, wherein the critical excepted instructions include loud/store traps.

5. The processor of claim 2, wherein the critical excepted instructions include jump mispredictions.

6. The processor of claim 1, wherein the non-critical excepted instructions comprise exceptions that are not performance critical.

7. The processor of claim 6, wherein the non-critical excepted instructions include illegal instructions.

8. The processor of claim 6, wherein the non-critical excepted instructions include cache parity errors.

9. The processor of claim 6, wherein the non-critical excepted instructions include invalid instructions.

10. The processor of claim 6, wherein the excepted instructions include arithmetic overflows.

11. The processor of claim 1, wherein the second exception handler operates non-speculatively.

12. The processor of claim 1, wherein the second exception handler causes non-critical excepted instructions to be resolved only when it is certain that the excepted instruction is in an executing program.

13. The processor of claim 1, further comprising a plurality of pipelines with multiple stages, and wherein excepted instructions may arise in one or more of the pipeline stages.

14. The processor of claim 13, wherein excepted instructions arising from said one or more pipeline stages is routed to the first exception handler or second exception handler based on a predetermined criteria.

15. The processor as in claim 14, wherein the predetermined performance criteria relates to performance of the processor.

16. A processor, comprising:
    a first exception handler that receives and handles critical excepted instructions, wherein the first exception handler causes critical excepted instructions to be resolved on a speculative basis, even though the excepted instruction may not be in an actual program path; and
    a second exception handler that receives and handles non-critical excepted instructions.

17. An exception handler for a processor that resolves excepted instructions, comprising:
    a speculative exception handler that receives critical excepted instructions and resolves said critical excepted instructions on a speculative basis, wherein the speculative exception handler causes critical excepted instructions to be expeditiously resolved even though the critical excepted instruction may not be in an actual path of an executing program; and
    a non-speculative exception handler that receives non-critical excepted instructions and resolves said non-critical excepted instructions on a non-speculative basis.

18. A processor, comprising:
    at least one pipeline with a plurality of stages;
    an algorithm for detecting non-executable instructions in said at least one pipeline, wherein said algorithm generates a command that identifies the non-executable instruction and identifies a reason that the non-executable instruction will not execute;

a speculative exception handler that receives said command for any non-executable instructions that are critical to processor performance, wherein the speculative exception handler expeditiously resolves critical non-executable instructions even though the critical non-executable instruction may not be in an actual path of an executing program; and a non-executable exception handler that receives said command for any non-executable instructions that are not critical to processor performance.

19. The processor as in claim 18, wherein said speculative exception handler includes logic for resolving critical non-executable instructions.

20. A method of handling exceptions in a processor during the execution of a program, comprising:

detecting an exception in one or more stages of one or more pipelines;

identifying if the exception is critical to the performance of the processor;

routing critical exceptions to a first exception handler;

routing all non-critical exceptions to a second exception handler;

resolving critical exceptions by handling the critical exceptions even if the instructions associated with the critical exceptions are still speculative.

21. A method of handling exceptions in a processor during the execution of a program, comprising:

detecting an exception in one or more stages of one or more pipelines;

identifying if the exception is critical to the performance of the processor;

routing critical exceptions to a first exception handler;

routing all non-critical exceptions to a second exception handler; and expeditiously resolving critical exceptions even though the critical exception may not be in an actual path of the program.

22. A method of handling exceptions in a processor during the execution of a program, comprising:

detecting an exception and identifying if the exception is critical or non-critical to the processor performance;

routing critical exceptions to a speculative exception handler;

routing all non-critical exceptions to a non-speculative exception handler; and resolving the critical exceptions even though the critical exceptions may not be in an actual path of the program.

23. A method of handling exceptions in a processor during the execution of a program, comprising:

detecting an exception in one or more stages of one or more pipelines;

determining whether the exception is critical to the performance of the processor; and resolving critical exceptions even though the critical exceptions may not be in an actual path of the program.

24. The method as defined in claim 23 further comprising:

routing critical exceptions to a first exception handler; and routing all non-critical exceptions to a second exception handler.

25. An exception handler that resolves excepted instructions, comprising:

a speculative exception handler that receives critical excepted instructions and resolves said critical excepted instructions on a speculative basis, wherein the speculative exception handler causes critical excepted instructions to be expeditiously resolved even though the critical excepted instruction may not be in an actual path of an executing program; and a non-speculative exception handler that receives non-critical excepted instructions and resolves said non-critical excepted instructions on a non-speculative basis.

* * * * *

UNITED STATES PATENT AND TRADEMARK OFFICE
CERTIFICATE OF CORRECTION

PATENT NO. : 6,925,552 B2 Page 1 of 1
APPLICATION NO. : 09/884675
DATED : August 2, 2005
INVENTOR(S) : Matthew H. Reilly et al.

It is certified that error appears in the above-identified patent and that said Letters Patent is hereby corrected as shown below:

In column 3, line 7, delete "modem" and insert -- modern --, therefor.

In column 3, line 9, delete "modem" and insert -- modern --, therefor.

In column 7, line 17, delete "160." and insert -- 150. --, therefor.

In column 7, line 27, delete "s" and insert -- is --, therefor.

In column 7, line 32, delete "160" and insert -- 150 --, therefor.

In column 8, line 9, in Claim 4, delete "loud/store" and insert -- load/store --, therefor.

In column 9, line 8, in Claim 18, delete "non-executable" and insert
-- non-speculative --, therefor.

In column 10, line 25, in Claim 25, delete "handier" and insert -- handler --, therefor.

Signed and Sealed this

Eleventh Day of August, 2009

David J. Kappos
*Director of the United States Patent and Trademark Office*